(12) United States Patent  (10) Patent No.: US 8,044,926 B2
Shoji  (45) Date of Patent: Oct. 25, 2011

(54) INFORMATION DISPLAY PANEL (75) Inventor: Takanori Shoji, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 1074 days.

(21) Appl. No.: 11/720,957

(22) PCT Filed: Dec. 8, 2005

(86) PCT No.: PCT/JP2005/022544
§ 371 (c)(1),
(2), (4) Date: Jun. 6, 2007

(87) PCT Pub. No.: WO2006/062155
PCT Pub. Date: Jun. 15, 2006

(65) Prior Publication Data
US 2009/0231251 A1   Sep. 17, 2009

(30) Foreign Application Priority Data
Dec. 8, 2004 (JP) .................................. 2004-355530

(51) Int. Cl.
*G09G 3/34* (2006.01)
(52) U.S. Cl. ............ 345/107; 345/84; 345/85; 345/105; 359/296
(58) Field of Classification Search ............ 345/87–107; 359/296
See application file for complete search history.

(56) References Cited

U.S. PATENT DOCUMENTS

| 6,304,308 | B1 | 10/2001 | Saito et al. | |
| 6,750,843 | B2* | 6/2004 | Sakamaki et al. | 345/105 |
| 6,858,164 | B2* | 2/2005 | Yanagisawa | 252/583 |
| 7,679,815 | B2* | 3/2010 | Kobayashi et al. | 345/107 |
| 2003/0025868 | A1* | 2/2003 | Hiroshima et al. | 349/156 |
| 2007/0171185 | A1* | 7/2007 | Sakurai et al. | 345/107 |

FOREIGN PATENT DOCUMENTS

| EP | 1715376 A1 | 10/2006 |
| JP | 4-57819 | 5/1992 |
| JP | 4-93825 | 8/1992 |
| JP | 2003066467 A | 3/2003 |
| JP | 2004-199003 A | 7/2004 |
| WO | 2005076065 A1 | 5/2005 |
| WO | WO 2006011418 A1 * | 2/2006 |

OTHER PUBLICATIONS

Office Action for JP 2006-546750 dated Aug. 16, 2011.

* cited by examiner

*Primary Examiner* — Bipin Shalwala
*Assistant Examiner* — Ryan A Lubit
(74) *Attorney, Agent, or Firm* — Sughrue Mion, PLLC

(57) ABSTRACT

In an information display panel, in which one or more groups of display media having light reflectance and charge characteristic, constituted by at least one group of particles, are sealed between opposed two substrates, at least one substrate being transparent, and, in which the display media, to which an electrostatic field is applied, are made to move so as to display information, in order to seal a space between one substrate and the other substrate, a gap-space maintaining member is formed at either one or both of an outer side and an inner side with respect to a sealing-agent arranging portion arranged at an outer peripheral portion of an information display region of the panel.

3 Claims, 8 Drawing Sheets

INFORMATION DISPLAY PANEL

TECHNICAL FIELD

The present invention relates to an information display panel, in which at least one group of display media having light reflectance and charge characteristic, constituted by at least one group of particles, are sealed between opposed two substrates, at least one substrate being transparent, and, in which the display media, to which an electrostatic field is applied, are made to move so as to display information.

RELATED ART

As an information display device substitutable for liquid crystal display (LCD), information display devices with the use of technology such as an electrophoresis method, an electro-chromic method, a thermal method, a dichroic-particles-rotary method and so on are proposed.

As for these information display devices, it is conceivable as inexpensive visual display device of the next generation from a merit having wide field of vision close to normal printed matter, having smaller consumption, or having a memory function, as compared with LCD, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an information display panel, in which one or more groups of display media having light reflectance and charge characteristic, constituted by at least one group of particles, are sealed between opposed two substrates, at least one substrate being transparent, and, in which the display media, to which an electrostatic field generated between the substrates is applied, are made to move so as to display information such as an image, is known.

In the information display panel having the construction mentioned above, there is a sealing-agent arranging portion for sealing a space between the substrates by means of a sealing agent, which is arranged at an outermost peripheral portion between two substrates. In the case of using a non-flexible substrate such as a glass substrate as the substrate at a display surface side, even if the two substrates are connected by pressing the substrate at the display surface side by means of a ram-head of a pressing machine, the substrate at the display surface side is never flexed.

However, in the case of using a flexible substrate such as a substrate made of resin or a thin substrate having a film shape as the substrate at the display surface side, if the two substrates try to be connected by pressing the substrate at the display surface side by means of the ram-head, the substrate at the display surface side is press-deformed at the sealing-agent arranging portion, and thus there is a drawback such that a gap-space between two upper and lower substrates becomes uneven. As a result, since the sealing agent is carbonized by a tracking, a conductive pass is formed at an electrode wiring portion arranged on the substrate, and there is a drawback such that the information display panel is broken.

DISCLOSURE OF THE INVENTION

The present invention has for its object to eliminate the drawbacks mentioned above and to provide an information display panel, which can maintain an adequate gap endurable for a high voltage application and prevent preferably a breakage of the information display panel.

According to the invention, an information display panel, in which one or more groups of display media having light reflectance and charge characteristic, constituted by at least one group of particles, are sealed between opposed two substrates, at least one substrate being transparent, and, in which the display media, to which an electrostatic field is applied, are made to move so as to display information, is characterized in that, in order to seal a space between one substrate and the other substrate, a gap-space maintaining member is formed at either one or both of an outer side and an inner side with respect to a sealing-agent arranging portion arranged at an outer peripheral portion of an information display region of the panel.

As a preferred embodiment of the particles for display media according to the invention, there are cases: such that, in the case of arranging the gap-space maintaining member at the inner side of the sealing-agent arranging portion, a position of the gap-space maintaining member is not overlapped with the information display region; such that the gap-space maintaining member has a line shape; such that, in the case of forming the gap-space maintaining member as a continuous member, the gap-space maintaining member is formed by a construction or a material, which allows a gas transmitting function; and such that, in the case of forming the gap-space maintaining member as a discontinuous member, the gap-space maintaining member is not unevenly arranged, even if the gap-space maintaining member is formed at either one of the outer side, the inner side and the both side with respect to the sealing-agent peripheral portion arranged at the outer peripheral portion of the information display region of the panel.

According to the invention, since, in order to seal a space between one substrate and the other substrate, a gap-space maintaining member is formed at either one or both of an outer side and an inner side with respect to a sealing-agent arranging portion arranged at an outer peripheral portion of an information display region of the panel, it is possible to obtain the information display panel, which can maintain the adequate gap endurable for the high voltage application and prevent preferably a breakage of the information display panel.

BEST MODE FOR CARRYING OUT THE INVENTION

At first, a basic construction of an information display panel according to the invention will be explained. In the information display panel according to the invention, an electrostatic field is applied to the display media sealed between opposed two substrates. Along a direction of the applied electrostatic field, charged display media are attracted by means of a force due to electrostatic field or Coulomb's force, and, the display media are moved reciprocally by varying a direction of the electrostatic field due to a potential switching, so that information such as an image can be displayed. Therefore, it is necessary to design the information display panel in such a manner that the display media can move evenly and maintain stability during a reciprocal operation or during a display information reserving state. Here, as to forces applied to the particles constituting the display media, there are an attraction force between the particles due to Coulomb' force, an imaging force with respect to the electrode or the substrate, an intermolecular force, a liquid bonding force and a gravity.

Examples of the information display panel according to the invention will be explained with reference to FIGS. 1a and 1b-FIGS. 3a and 3b.

In the examples shown in FIGS. 1a and 1b, at least two or more groups of display media 3 having different optical reflectance and different charge characteristics and consisting of at least one or more groups of particles (here, white color display media 3W constituted by the particles and black color display media 3B constituted by the particles are shown) are moved in a perpendicular direction with respect to substrates 1 and 2, in accordance with an electric field applied from outside of the substrates 1 and 2, so as to display a black color by viewing the black color display media 3B to an observer or so as to display a white color by viewing the white color display media 3W to the observer. In the example shown in FIG. 1b, a cell is formed by arranging for example grid-like partition walls 4 between the substrates 1 and 2, in addition to the example shown in FIG. 1a. Moreover, in FIG. 1b, the partition walls arranged at the near side are omitted.

In the examples shown in FIGS. 2a and 2b, at least two or more groups of display media 3 having different colors and different charge characteristics and consisting of at least one or more groups of particles (here, white color display media 3W constituted by the particles and black color display media 3B constituted by the particles are shown) are moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black color display media 3B to an observer or so as to display a white color by viewing the white color display media 3W to the observer. In the example shown in FIG. 2b, a cell is formed by arranging for example grid-like partition walls 4 between the substrates 1 and 2, in addition to the example shown in FIG. 2a. Moreover, in FIG. 2b, the partition walls arranged at the near side are omitted.

In the examples shown in FIGS. 3a and 3b, one group of display media 3 having one color and one charge characteristic and consisting of at least one or more groups of particles (here, white color display media 3W constituted by the particles) is moved in a parallel direction with respect to substrates 1 and 2, in accordance with an electric field generated by applying a voltage between the electrode 5 arranged to the substrate 1 and the electrode 6 arranged to the substrate 1, so as to display a white color by viewing the white color display media 3W to an observer or so as to display a color of the electrode 6 or the substrate 1 by viewing a color of the electrode 6 or the substrate 1 to the observer. In the example shown in FIG. 3b, a cell is formed by arranging for example grid-like partition walls 4 between the substrates 1 and 2, in addition to the example shown in FIG. 3a. Moreover, in FIG. 3b, the partition walls arranged at the near side are omitted.

The above explanations can be applied to a case such that the white color display media 3W constituted by the particles are substituted by white color display media constituted by liquid powders or a case such that the black color display media 3B constituted by the particles are substituted by black color display media constituted by liquid powders.

Figure 1:
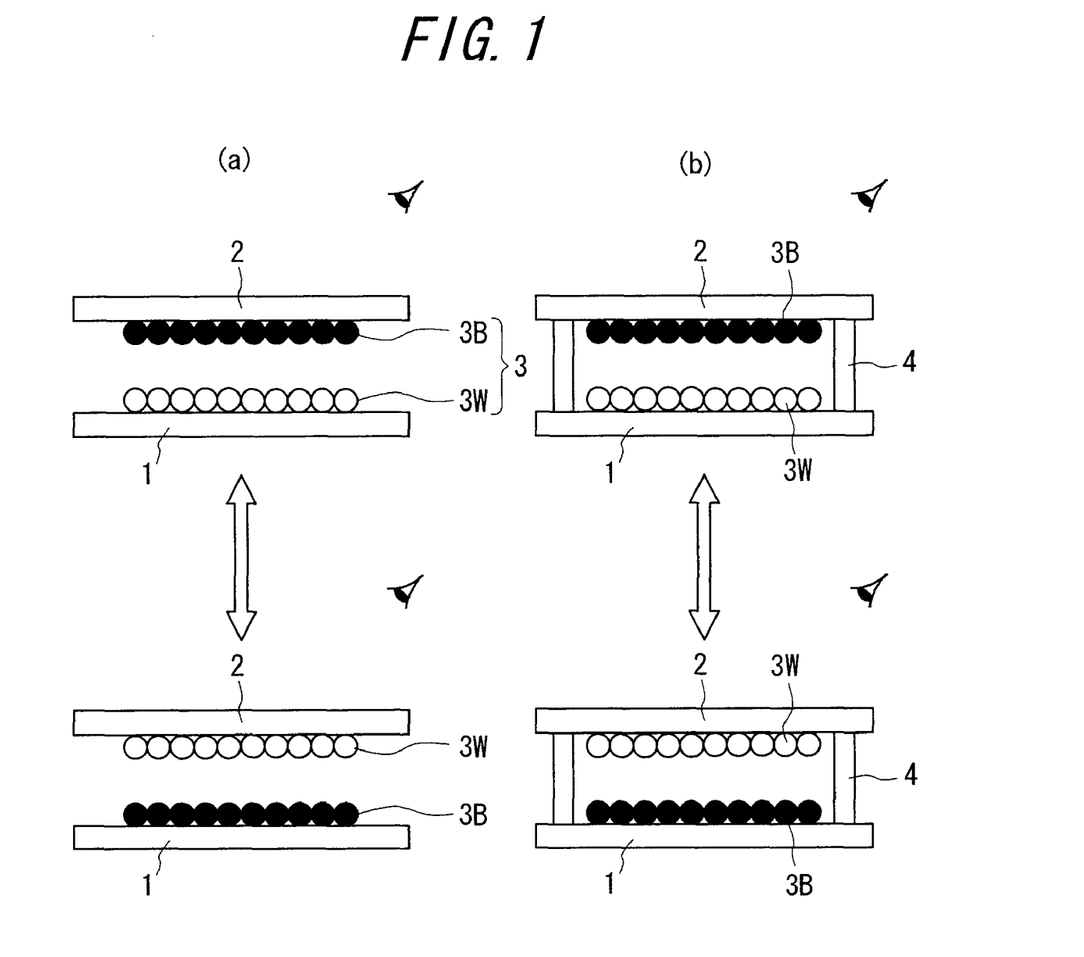
FIGS. 1a and 1b are schematic views respectively showing one embodiment of the information display panel according to the invention.
Figure 2:
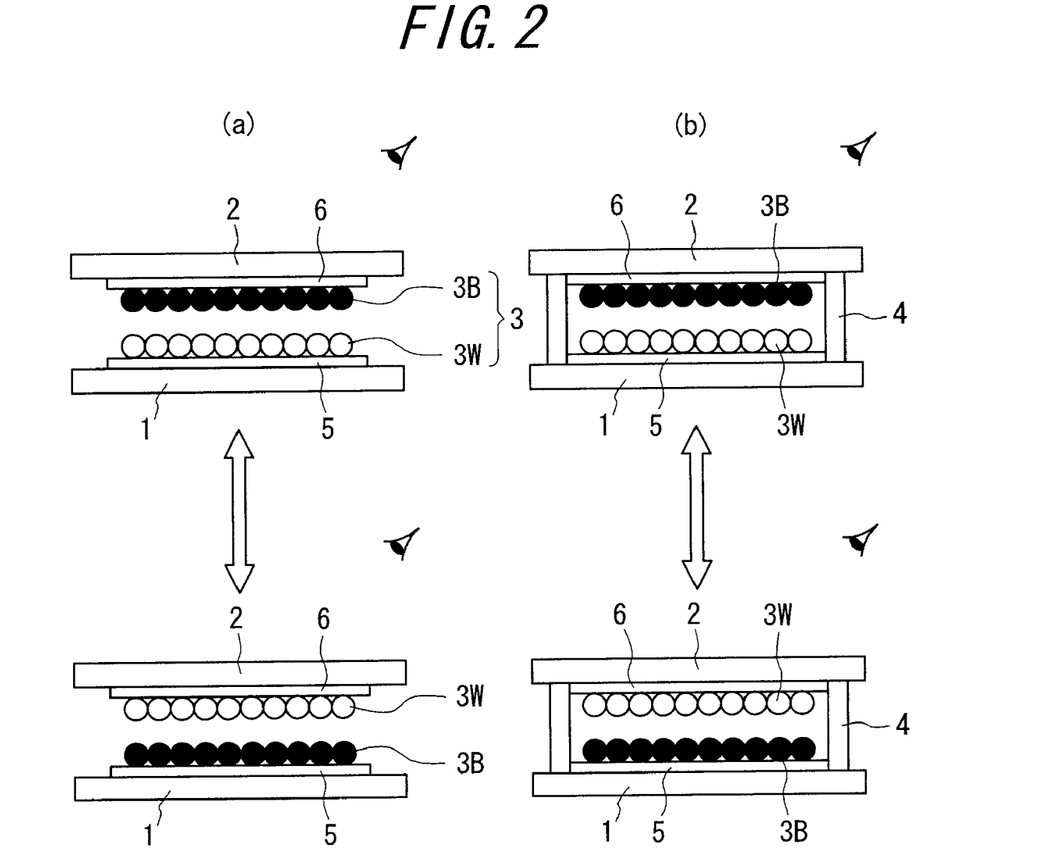
FIGS. 2a and 2b are schematic views respectively illustrating another embodiment of the information display panel according to the invention.
Figure 3:
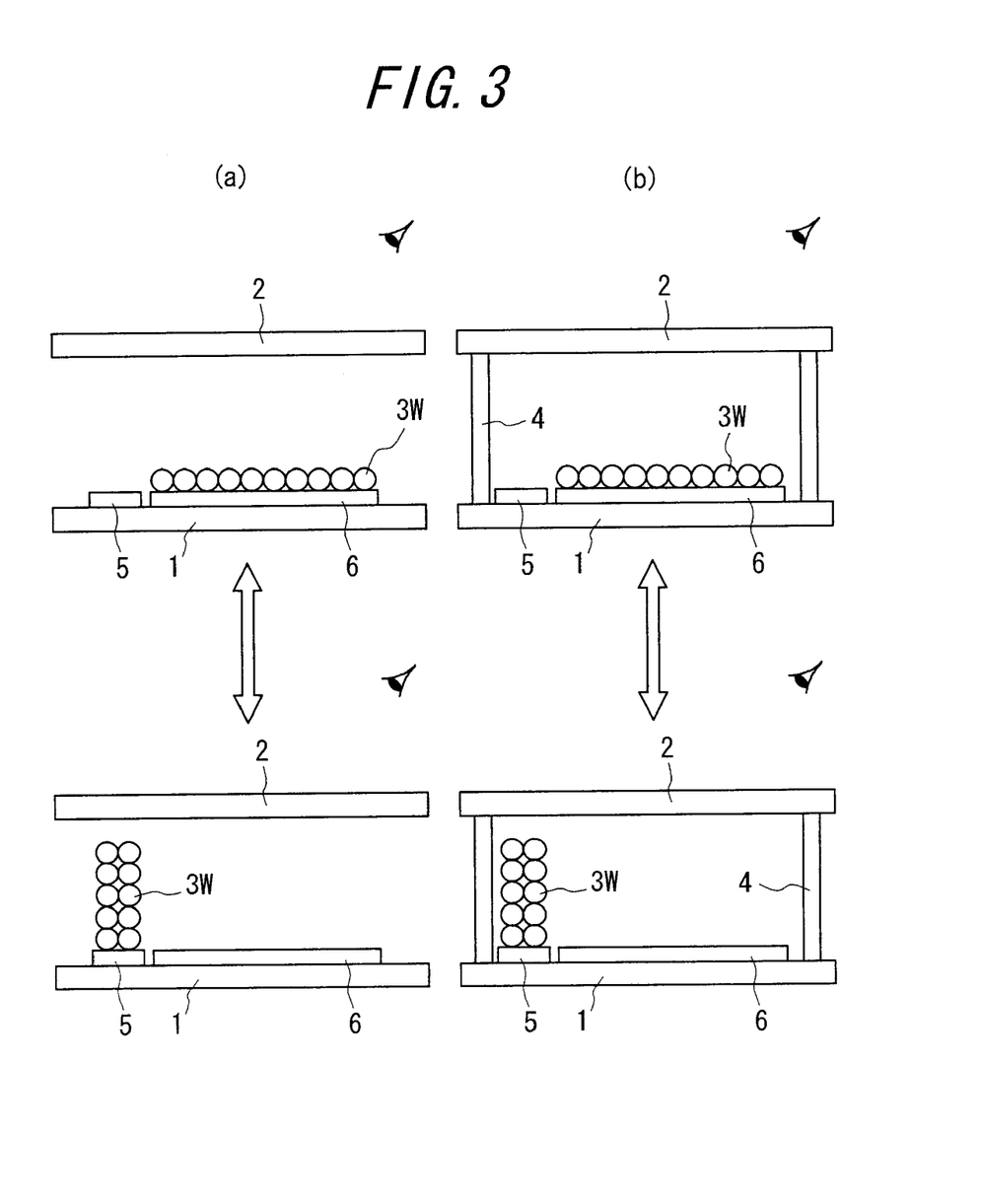
FIGS. 3a and 3b are schematic views respectively depicting still another embodiment of the information display panel according to the invention.
Figure 4:
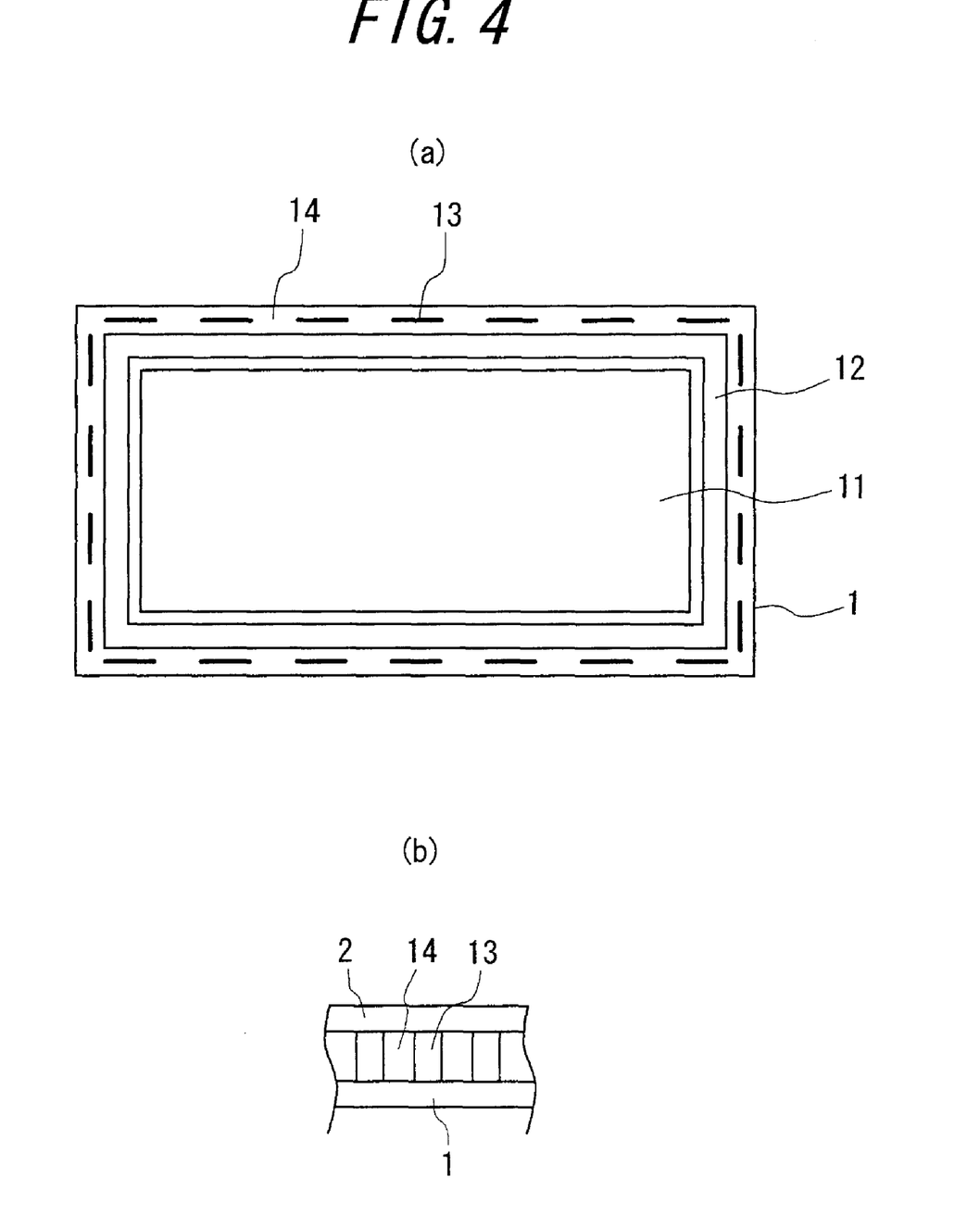
FIGS. 4a and 4b are schematic views respectively showing one construction of the information display panel according to the invention.

FIGS. 4a and 4b are schematic views respectively showing one embodiment of the information display panel according to the invention. In these figures, FIG. 4a is a plan view thereof and FIG. 4b is a front view thereof. In the embodiment shown in FIGS. 4a and 4b, for example on the substrate 1 of a rear side, a sealing-agent arranging portion 12 for sealing a space between the substrate 1 and the substrate 2 is arranged at a peripheral portion of an information display region 11 of the panel constituted by a plurality of cells formed by partition walls 4 (not shown here). A feature of the present invention is that a gap-space maintaining member 13 is arranged at either of an outer side or an inner side with respect to the sealing-agent arranging portion 12. In the embodiment shown in FIG. 4, a plurality of short line-shaped gap-space maintaining members 13 are formed at the outer side of the sealing-agent arranging portion 12, and thus a space 14 for discharging gas is formed between the gap-space maintaining members 13. Moreover, it is defined that a height of the gap-space maintaining member 13 is substantially same as that of the partition wall 4 arranged to the information display region 11. Further, the gap-space maintaining member 13 is not arranged to the sealing-agent arranging portion 12.

In the embodiment shown in FIGS. 4a and 4b, a position, at which the gap-space maintaining member 13 is arranged, is not limited to the outer side, but it may be arranged to the inner side or may be arranged at both of the outer side and the inner side. Moreover, a material for forming the gap-space maintaining member 13 is not specifically limited, but a material for forming the partition wall 4 mentioned below may be preferably used therefore. Further, a method for forming the gap-space maintaining member 13 is not specifically limited, but a method for forming the partition wall 4 mentioned below may be used and the gap-space maintaining member 13 may be formed simultaneously with the forming of the partition wall 4.

Figure 5:
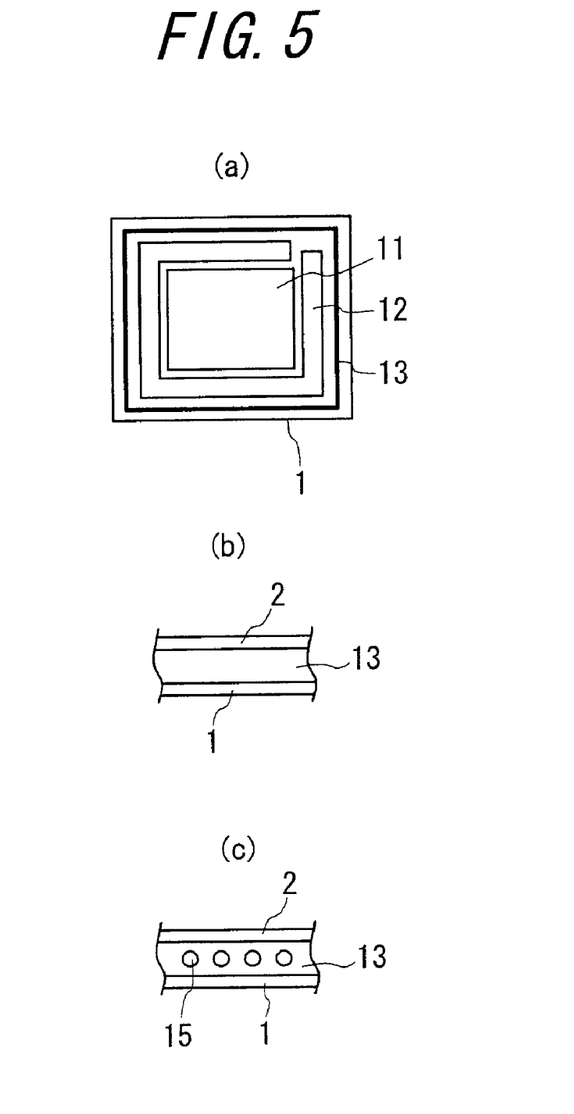
FIGS. 5a-5c are schematic views respectively explaining one embodiment of the gap-space maintaining member in the information display panel according to the invention.
Figure 6:
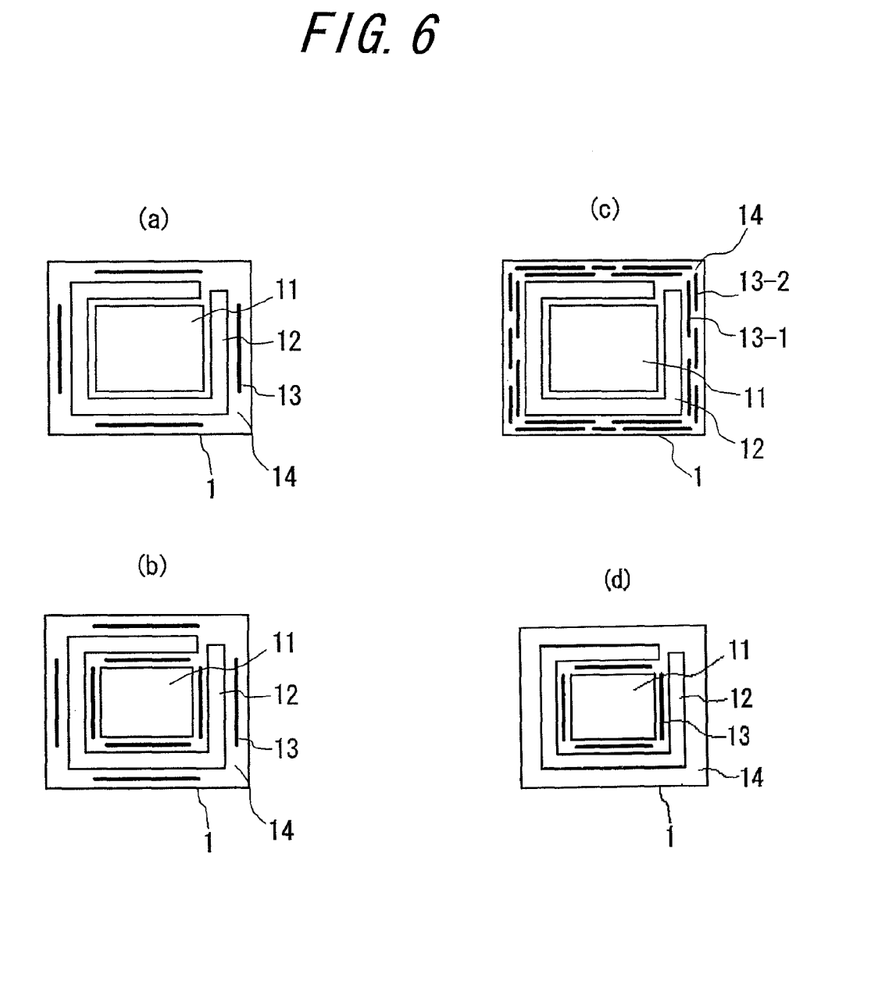
FIGS. 6a-6c are schematic views respectively explaining another embodiment of the gap-space maintaining member in the information display panel according to the invention.

FIGS. 5a-5c are schematic views respectively explaining one embodiment of the gap-space maintaining member in the information display panel according to the invention. In these figures, FIG. 5a is a plan view thereof, and FIGS. 5b-5c are front views thereof. In the embodiments shown in FIGS. 5a-5c, the gap-space maintaining member 13, which has a continuous line shape and has no space 14 for discharging gas, is arranged at the outer side of the sealing-agent arranging portion 12. With respect to the gap-space maintaining member 13, no space 14 for discharging gas may be arranged as shown in FIG. 5b, or, a hole 15 for discharging gas may be arranged as shown in FIG. 5c. In the case of using the gap-space maintaining member 13 having no holes 15 for discharging gas as shown in FIG. 5, it is preferred that the gap-space maintaining member 13 may be formed by a material having a gas transmitting property.

FIGS. 6a-6d are schematic views respectively explaining another embodiment of the gap-space maintaining member in the information display panel according to the invention. In the embodiment shown in FIG. 6a, with respect to the outer side of the sealing-agent arranging portion 12, a plurality of line-shaped gap-space maintaining members 13 are arranged, and, the space 14 for discharging gas is formed between the gap-space maintaining members 13. In the embodiment shown in FIG. 6b, with respect to the outer side and the inner side of the sealing-agent arranging portion 12 respectively, a plurality of line-shaped gap-space maintaining members 13 are arranged, and, the space 14 for discharging gas is formed between the gap-space maintaining members 13. In the embodiment shown in FIG. 6c, with respect to the outer side of the sealing-agent arranging portion 12, a plurality of line-shaped gap-space maintaining members 13 are arranged double, i.e., constituted by an inner gap-space maintaining member 13-1 and an outer gap-space maintaining member 13-2, and, the space 14 for discharging gas is arranged between the gap-space maintaining members 13-1 and between the gap-space maintaining members 13-2 respectively. In the embodiment shown in FIG. 6d, the gap-space maintaining member 13 is arranged on the inner side of the sealing-agent arranging portion 12.

Figure 7:
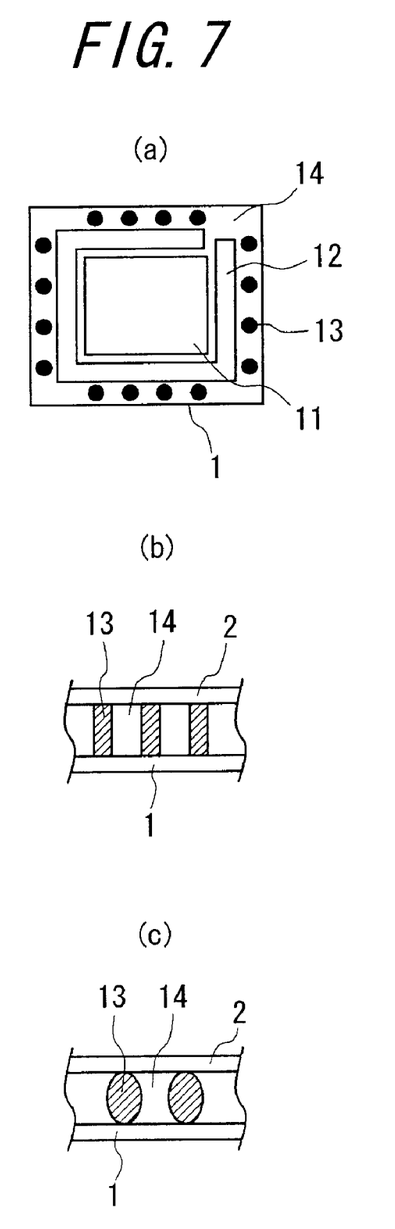
FIGS. 7a-7c are schematic views respectively explaining still another embodiment of the gap-space maintaining member in the information display panel according to the invention.

FIGS. 7a-7c are schematic views respectively explaining still another embodiment of the gap-space maintaining member in the information display panel according to the invention. In these figures, FIG. 7a is a plan view thereof and FIGS. 7b-7c are front views thereof. In the embodiment shown in FIGS. 7a-7c, with respect to the outer side of the sealing-agent arranging portion 12, a plurality of dot-shaped gap-space maintaining members 13 are arranged, and, the space 14 for discharging gas is formed between the gap-space maintaining members 13. A shape of the gap-space maintaining member 13 may be a column shape as shown in FIG. 7b or may be a barrel shape as shown in FIG. 7c.

In the embodiments mentioned above, the gap-space maintaining member 13 may be formed continuously or discontinuously. A shape of the gap-space maintaining member 13 may be a wall shape, a line shape, a column shape, a spherical shape, a polygonal line shape and so on. Moreover, the gap-space maintaining member 13 may be formed by using the same material as that of the partition wall 4 by means of a photolithograph method and may be formed simultaneously with the formation of the partition wall 4. Of course, it is not always necessary to do so. Further, the gap-space maintaining member 13 may be formed by using a photolithography method after forming the partition wall or may be formed by using another method (for example, providing a column shaped member or a square shaped member).

Hereinafter, respective members constituting the information display panel according to the invention will be explained.

Figure 8:
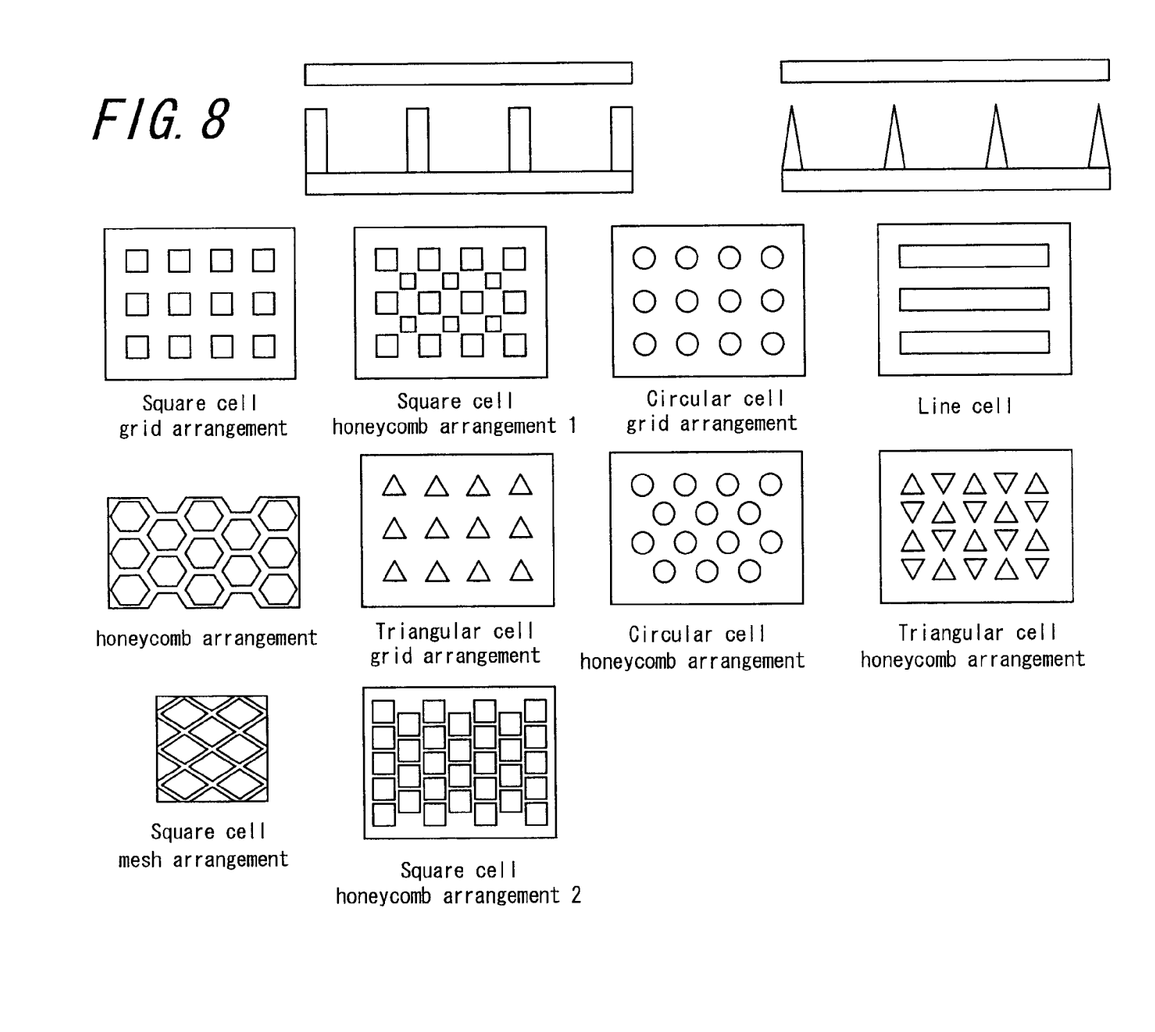
FIG. 8 is a schematic view showing one embodiment of a shape of the partition walls in the information display panel according to the invention.

As the partition wall 4, a height and a width of the partition wall are suitably designed in accordance with a kind of the display media used for the display and is not restricted. However, it is preferred to set a width of the partition wall to 2-100 μm more preferably 3-50 μm and to set a height of the partition wall to 10-500 μm more preferably 10-200 μm. A shape of the partition wall may be a line shape (including a wave line shape and a zigzag line shape), a square shape, a triangular shape, a circular shape and a hexagon shape, and an arrangement of the partition wall may be a grid, a honeycomb and a mesh, as shown in FIG. 8. It is preferred that the portion corresponding to a cross section of the partition wall observed from the display side (an area of the frame portion of the cell) should be made as small as possible. In this case, a clearness of the image display can be improved.

As the substrate, at least one of the substrates (front substrate) is the transparent substrate 2 through which a color of the display media can be observed from outside of the information display panel, and it is preferred to use a material having a high transmission factor of visible light and an excellent heat resistance. The substrate 1 may be transparent or may be opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or so having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, there is a drawback as a thin-type information display panel.

In the case of arranging the electrode on the substrate, the electrode 6 arranged on the substrate 2 at the display surface side, which needs transparency since it is an observation side, is formed by a conductive material having transparency and pattern formability. As such materials, use is made of metals such as aluminum, silver, nickel, copper, gold, or, conductive metal oxides such as ITO, indium oxide, conductive tin oxide, conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode 5 arranged to the rear substrate 1 are the same as those of the electrode 6 mentioned above, but transparency is not necessary. In this case, the applied outer voltage may be superimposed with a direct current or an alternate current.

Then, liquid powders as the display media used in the information display panel according to the invention will be explained. It should be noted that a right of the name of liquid powders as the display media of the invention is granted to the applicant as "Electronic Liquid Powders (Registered): register number 4636931".

In the present invention, a term "liquid powders" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powders according to the invention are a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display panel according to the invention, a solid material is used as a dispersant.

The information display panel which is a target of the present invention has a construction such that the liquid powders composed of a solid material stably floating as a dispersoid in a gas and exhibiting a high fluidity in an aerosol state are sealed between opposed two substrates, wherein one of two substrates is transparent. Such liquid powders can be made to move easily and stably by means of Coulomb's force and so on generated by applying a low voltage.

As mentioned above, the liquid powders means an intermediate material having both of liquid properties and particle properties and exhibiting a self-fluidity without utilizing gas force and liquid force. Such liquid powders become particularly an aerosol state. In the information panel according to the invention, the liquid powders used in a state such that a solid material is relatively and stably floating as a dispersoid in a gas.

Then, the particles for display media constituting the display media used in the information display panel according to the invention (hereinafter, sometimes called only as particles) will be explained. The particles for display media are used as the display media constituted by the particles for display media only, or, constituted by mixing them with the other particles, or, constituted as the liquid powders by controlling them.

The particles for display media may be composed of resins as a main ingredient, and can include according to need charge control agents, coloring agent, inorganic additives and so on as is the same as the known one. Hereinafter, typical examples of resin, charge control agent, coloring agent, additive and so on will be explained.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds and colors of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hansayellow G, hansayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent.

Moreover, as the average particle diameter d(0.5) of the particles to be used, it is preferred to set d(0.5) to 0.1-50 μm and to use even particles. If the average particle diameter d(0.5) exceeds this range, the image clearness sometimes deteriorated, and, if the average particle diameter is smaller than this range, an agglutination force between the particles becomes too large and the movement of the particles is prevented.

Further, it is preferred that particle diameter distribution Span of the particles, which is defined by the following formula, is less 5 preferably less than 3:

$$\text{Span} = (d(0.9) - d(0.1))/d(0.5);$$

(here, d(0.5) means a value of the particle diameter expressed by μm wherein an amount of the particles having the particle diameter larger than or smaller than this value is 50%, d(0.1) means a value of the particle diameter expressed by μm wherein an amount of the particles having the particle diameter smaller than this value is 10%, and d(0.9) means a value of the particle diameter expressed by μm wherein an amount of the particles having the particle diameter smaller than this value is 90%).

If the particle diameter distribution Span of the particles is set to not more than 5, the particle diameter becomes even and it is possible to perform an even particle movement.

Furthermore, as a correlation between the particles, it is preferred to set a ratio of d(0.5) of the particles having smallest diameter with respect to d(0.5) of the particles having largest diameter to not more than 50 preferably not more than 10. Although the particle diameter distribution Span is made smaller, it is preferred that the same amount of particles having different charge characteristics with each other can be easily moved in reverse direction, since the particles having different charge characteristics are moved reversely. This is the reason for the above range.

Here, the particle-diameter-distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle-diameter, and thus it is possible to measure the particle-diameter and the particle-diameter-distribution.

In the present invention, it is defined that the particle-diameter and the particle diameter distribution are obtained by a volume standard distribution. Specifically, the particle-diameter and the particle-diameter-distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the display media properly depends upon the measuring condition. However, it is understood that the charge amount of the display media used for the display media in the information display panel substantially depends upon an initial charge amount, a contact with respect to the partition wall, a contact with respect to the substrate, a charge decay due to an elapsed time, and specifically a saturation value of the particles for the display media during a charge behavior is a main factor.

The inventor found after keen examination that a range of the suitable charge characteristics of the particles used for the display media can be estimated by performing a charge amount measurement of the particles used for the display media by using the same carrier particles in a blow-off method.

Further, in the dry-type information display panel in which the display media constituted by the particles for display media are driven in an air space, it is important to control a gas in a gap surrounding the display media between the substrates, and a suitable gas control contributes an improvement of display stability. Specifically, it is important to control a humidity of the gap gas to not more than 60% RH at 25° C., preferably not more than 50% RH.

The above gap means a gas portion surrounding the display media obtained by substituting the electrodes 5, 6 (in the case of arranging electrode inside of substrate), an occupied portion of the display media 3, an occupied portion of the partition walls 4 (in the case of arranging partition walls) and a seal portion of the device from the space between the substrate 1 and the substrate 2 for example in FIGS. 1a and 1b-FIGS. 3a and 3b.

A kind of the gap gas is not limited if it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the substrate under an atmosphere having a predetermined humidity and to apply a seal member and a seal method for preventing a humidity inclusion from outside of the device.

In the information display panel according to the invention, an interval between the substrates is not restricted if the display media can be moved and a contrast can be maintained, and it is adjusted normally to 10-500 μm, preferably 10-200 μm.

Moreover, it is preferred to control a volume occupied rate of the display media in a space between the opposed substrates to 5-70%, more preferably 5-60%. If the volume occupied rate of the display media exceeds 70%, the display media become difficult to move, and if it is less than 5%, a sufficient contrast cannot be obtained and a clear image display is not performed.

INDUSTRIAL APPLICABILITY

The image display panel according to the invention is applicable to the image display unit for mobile equipment such as notebook personal computers, PDAs, cellular phones, handy terminal and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric POP, electric advertisement, electric price tag, electric shelf label, electric musical score, RF-ID device and so on.

The invention claimed is:

1. An information display panel, in which one or more groups of display media having light reflectance and charge characteristic, constituted by at least one group of particles, are sealed between opposed two substrates, at least one substrate being transparent, and, in which the display media, to which an electrostatic field is applied, are made to move so as to display information, characterized in that, in order to seal a space between one substrate and the other substrate, a gap-space maintaining member is formed at either one or both of an outer side and an inner side with respect to a sealing-agent arranging portion arranged at an outer peripheral portion of an information display region of the panel, wherein in the case of forming the gap-space maintaining member as a continuous member, the gap-space maintaining member is formed by a construction or a material, which allows a gas transmitting function; and gas is discharged from the display region through a space in the sealing-agent arranging portion and through the gap-space maintaining member.

2. The information display panel according to claim 1, wherein, in the case of arranging the gap-space maintaining member at the inner side of the sealing-agent arranging portion, a position of the gap-space maintaining member is not overlapped with the information display region.

3. The information display panel according to claim 1, wherein the gap-space maintaining member has a line shape.

* * * * *